3,200,091
REMOISTENABLE ADHESIVE COMPOSITIONS AND METHOD FOR MAKING THE SAME
William W. Sederlund, Berkeley Heights, N.J., and Carl D. Marotta, Southampton, Pa., assignors to National Starch and Chemical Corporation, New York, N.Y., a corporation of Delaware
No Drawing. Filed Mar. 14, 1962, Ser. No. 179,785
10 Claims. (Cl. 260—8)

This invention relates to water remoistenable adhesive compositions, to substrates coated therewith, and to a method for making the same.

So-called remoistenable adhesives are commonly utilized in the preparation of tapes, labels, wall paper, posters, envelopes, and similar products wherein it is desired to provide a dry adhesive film which on being moistened with water will become tacky and thereby allow for the ready adhesion of the thus coated product to a variety of substrates. In the manufacture of remoistenable adhesive products, it is the usual practice to prepare an aqueous solution or dispersion of the dry adhesive material, which is commonly called "gum." After applying a film of the dispersed gum to a paper substrate, the water is evaporated and the resulting dry, continuous film of gum material will, on being moistened with water, produce the desired tacky, adhesive surface.

A difficulty commonly encountered in working with remoistenable adhesive coated papers is that of "curl." Since the paper backing and the continuous adhesive film exhibit different rates of expansion on absorbing atmospheric moisture or different rates of contraction on losing moisture, the gummed papers curl or roll up on exposure to varying conditions of humidity. In order to minimize the detrimental effects resulting from the dissimilar expansion or contraction rates of the adhesive film and the paper substrate, an attempt is usually made to produce a discontinuous adhesive surface. The latter is often accomplished by mechanically breaking the continuous surface into smaller sections. This rather harsh procedure often damages the paper sheet, and moreover, the mechanical breaking method is not altogether effective in preventing curl.

It is an object of this invention to provide a method for producing remoistenable adhesive products whose excellent dimensional stability provides freedom from curl. It is another object of this invention to provide an effective and economical method for producing remoistenable adhesive products. A further object of this invention is to provide remoistenable adhesive products which possess superior binding and processing properties. Other objects and the advantages of this invention will be apparent from the discussion that follows hereinafter.

In accordance with the preferred embodiment of this invention, the water insoluble resin particles of an aqueous polymeric emulsion or latex are first swelled by the addition to said emulsion or latex of a primary solvent which is an active solvent for the polymer particles contained therein. The swollen polymer particles are thereafter dissolved by the subsequent addition of a secondary water miscible solvent. The secondary water miscible solvent also serves to "tie up" or couple within the resulting solvent mixture the water which is present within the aqueous polymer emulsion or latex. The solvent solution of the polymer, which is in effect a binder for the system, is then used to disperse a remoistenable adhesive material, and the resulting adhesive formulation is then coated onto a paper or other substrate. Upon evaporation of the solvent mixture from the adhesive formulation, there is obtained a substrate coated with discrete particles of remoistenable adhesive which are suspended in a film of a water-insoluble binder. The coated substrates obtained by the process of this invention exhibit efficient remoistening ability, improved processing characteristics, and outstanding resistance to curl.

In another embodiment of this invention, the swollen polymer particles are dissolved by the addition of a secondary water immiscible solvent. When secondary water immiscible solvents are employed to dissolve the polymer particles, the water of the polymeric emulsion or latex undergoes emulsification in the solvent, rather than being coupled into the solvent mixture as occurs when water miscible solvents are employed. However, the emulsification of water in the solvent increases the difficulty of dispersing a remoistenable adhesive phase in the solvent phase, since the adhesive phase will then abosorb the water, swell, and therefore will not disperse smoothly, and may, in fact, settle on standing. The use of this technique thus requires greater care in the manufacturing process and may result in a system having limited liquid stability. For the purposes of this invention, solvents which are only slightly miscible with water may be considered as being immiscible with water. Thus, if a solvent does not couple a sufficient quantity of the water which is present in the emulsion or latex, i.e. if there is water which is free to emulsify in the solvent, then such a solvent may be considered as immiscible.

The preferred embodment of our invention comprises the use of secondary water miscible solvents in order to dissolve the resin particles. However, as was set forth previously, utilization of secondary water immiscible solvents in order to dissolve the polymer is also effective in some applications and may be employed where so desired by the practitioner. The scope of this invention comprehends both of the embodiments described hereinabove. In addition, the use of emulsion polymers or the use of polymeric latices are equally applicable in the process of our invention. Consequently, when reference is made hereinafter to emulsion polymers, it is to be understood that said reference is also applicable to polymeric latices.

As was noted hereinabove, the preparation of our resin binder systems involves the addition to an aqueous emulsion of a polymeric resin material of a primary active solvent for the resin polymer particles contained in said emulsion. An active solvent, for the purposes of this invention, may be defined as one which is capable of swelling and readily dissolving a major portion of the solute, i.e., the emulsified polymer particles, and which yields solutions of low viscosity. On addition of an active solvent to a polymer emulsion, the polymer particles contained therein will begin to soften and swell. This swelling is effected in order to facilitate the subsequent solution of the particles and also in order to obtain a solution which is free from undissolved polymer particles. After the polymer particles have been softened and swelled, their solution is completed, as was noted above, by adding a water miscible or immiscible secondary solvent to the mixture. In some instances, the swelling and solution of the emulsion particles may be effected in one step by adding to the emulsion an amount of solvent which will be sufficient to achieve the requisite swelling and solution without the use of any other solvent being subsequently required. In order to obtain the desired solution viscosity, additional amounts of water miscible or immiscible solvents may be added to the solution. In the preferred embodiment of our invention, sufficient amounts of water miscible secondary solvent must be added to the solution in order to prevent the water present in the solution from coagulating the suspended particles of remoistenable adhesive which are subsequently added to the solution. After a remoistenable adhesive has been suspended in the solution of the polymer, the resulting dispersion may then be coated onto a paper or other substrate and the solvent mixture evaporated, thereby leaving a dried, consolidated coating comprising discrete particles of remoistenable adhesive which are bound to each other and to the substrate by means of the water insoluble binder.

The polymers employed as binders for the adhesives of our invention must be soluble in the solvent or solvent mixtures which are utilized, the water content of said solvent mixtures being not more than about 15% by weight. The resins suitable for use in our invention include homo- and copolymers resulting from the aqueous emulsion polymerization of one or more ethylenically unsaturated monomers. Examples of such monomers include alkyl esters of acrylic and methacrylic acid, vinyl halides, vinyl esters of carboxylic acids, vinyl alkyl ethers, ethylenically unsaturated mono- and dicarboxylic acids, and the like. Particularly effective results were obtained in our procedure by employing adhesive binders comprising homo- and copolymers of such monomers as vinyl acetate, ethyl acrylate, methyl methacrylate, acrylic acid, methacrylic acid, and the like. Polyvinyl butyral is also a suitable binder for our adhesives. In order to be useful in the process of our invention, a polymer must exhibit the aforedescribed solubility characteristics. However, all of the polymers which do exhibit such solubility properties will not be equally efficient as adhesive binders in the process of our invention.

In preparing the resin binders applicable to the process of our invention, use is made of the well-known techniques which are employed for the polymerization of aqueous polymer emulsions or latices. In general, such methods involve the dispersion of one or more monomers as fine droplets in a nonsolvent which is usually water. The presence of common soaps or special emulsifying agents are usually required in order to reduce the interfacial tension between the two immiscible phases, and polymerization is ordinarily initiated by the use of water soluble free radical initiating catalysts, such as the persulfates.

The use in the process of our invention of resin binders which have been polymerized in emulsion or latex form offers several advantages over the use of polymers produced by other methods, such as solution or bulk polymerization. Thus, it will be noted that emulsion polymerization techniques provide high molecular weight polymers which exhibit great binding strength. Moreover, the polymer particles in an emulsion system are extremely small, thereby facilitating solution in the mixtures of water and water miscible solvent which are employed in our procedure. This latter feature is particularly important when only sparingly soluble polymers of high molecular weight are employed. The higher binding strength of emulsion polymerized polymers also makes it possible to utilize lower binder: dispersed adhesive ratios than could ordinarily be used with other type polymers of lower binding ability.

For the purposes of our invention, it is preferred to use aqueous emulsion polymers having an intrinsic viscosity ranging from about 0.6 to about 1.8. Intrinsic viscosity is a property used to characterize high polymers and gives an indication of their relative molecular weights. It should be noted that, in designating intrinsic viscosity, the percent of the material that is insoluble when the polymer is dissolved for purposes of the intrinsic viscosity determination is usually expressed as: intrinsic viscosity/percent of undissolved material. Thus, for example, 1.57/5 indicates that the polymer has an intrinsic viscosity of 1.57 and that 5% of the polymer remained undissolved during the intrinsic viscosity determination.

The active solvents used to swell the emulsion particles may be either water miscible or immiscible. As noted earlier, sufficient amounts of a secondary water miscible solvent may be added to the emulsion so as to prevent the water content of the emulsion from later coagulating the dispersed adhesive particles. Water immiscible solvents that can be used in our procedure as either primary or secondary solvents include toluene, low molecular weight esters of organic acids, such as ethyl acetate; carbon tetrachloride; chloroform; and similar compounds. Water miscible solvents that can be used in our procedure as either primary or secondary solvents include methanol, ethanol, isopropanol, acetone and the like. The choice of any particular solvent to be employed in the method of our invention is not a critical factor. It is necessary only that the primary solvent be capable of softening and swelling the emulsion polymer particles, and it is also required in the preferred embodiment of our invention that the subsequent or secondary solvent for the swollen particles be water miscible. In addition, the water content of the solvent mixture should be no more than about 15% by weight. As was mentioned previously, the swelling and solution of the particles may sometimes be effected in one step by adding a sufficient quantity of solvent to achieve these results without the subsequent use of another solvent. Of course, with this latter procedure, the solvent used must be an effective solvent for the polymer and must, in the preferred embodiment of our invention, also be water miscible.

The amount of dispersed remoistenable material employed in the formulation of this invention may vary considerably and is not a factor which is critical to our invention. There must be sufficient binding resin present for the purpose of effectively bonding the dispersed adhesive material to the substrate; however, the proportion of binding resin must not be so large as to interfere with efficient operation of the substance procedure. We have obtained particularly good remoistenable products by employing ratios of dispersed phase:binder ranging from 4:1 to 15:1.

The material which is used as the remoistenable adhesive in the process of our invention may be selected from a variety of adhesive materials. It is necessary only that the adhesive material selected is one which may be dispersed in the binder solution without coagulation and that, on evaporation of the solvent, it should become tackified when later moistened with water. Among the materials that may be employed as the remoistenable adhesive are included: natural gums, such as seaweed extracts, gum arabic, gum tragacanth, locust bean gum, and the like; starches, such as corn, sago, wheat, rice, sweet potato, sorghum, waxy sorghum, waxy maize, potato or tapioca, as well as components of these starches, such as amylose or amylopectin, and the conversion products and derivatives of the aforementioned starches, such as starch ethers, starch esters, dextrins, and the like; cellulose derivatives, such as methyl cellulose, carboxymethyl cellulose, hydroxyethyl cellulose, and the like; and proteinaceous materials, such as animal glue and water activatable casein derivatives. The starches and strach derivatives mentioned hereinabove must be water soluble or water remoistenable. These characteristics may be effected either by pregelatinization or by means of the method which is used in producing the particular starch derivative.

Various reagents or additives may be incorporated in our adhesive product in order to enhance certain properties thereof. Plasticizers may, for example, be used to impart flexibility to the binder. Also, certain additives may be included in the dispersed adhesive phase in order to improve tack, facilitate wetting, and provide a longer range, that is, to extend the time after remoistening during which the adhesive remains tacky.

Other advantages of our compostions reside in the improved techniques which they make possible in the manufacture of remoistenable adhesive products. The inclusion of water in our adhesive formulations not only helps to prevent settling of the dispersed adhesive particles, but also lessens the flash hazard commonly presented by the use of concentrated organic solvents. The remoistenable adhesive products obtained by the process of our invention can be employed in a variety of applications. So-called "lay-flat" gummed papers commonly used in preparing labels, decals, wallpaper, envelopes, and similar products are especially suitable for manufacture with the adhesives of our invention.

The following examples, in which all parts given are by weight unless otherwise indicated, will further illustrate the embodiment of our invention.

*Example I*

This example illustrates the production of a remoistenable adhesive product which exhibits a high degree of dimensional stability by means of the process of our invention.

(a) To 15 parts of a 55% solids aqueous emulsion of polyvinyl acetate (intrinsic viscosity=1.3) were added 7.5 parts of toluene, the emulsion thereby being converted to a highly swollen suspension. To this suspension were added 65 parts of ethyl alcohol so as to dissolve the swollen resin particles and to decrease the viscosity of the solution. 58 parts of a corn dextrin were thereafter suspended in the solution of the polyvinyl acetate, and the resulting dispersion was coated onto a paper substrate. Upon evaporation of the solvent mixture from the coating, there was obtained a dried, consolidated layer of discrete remoistenable adhesive particles which were bound to each other and to the substrate by means of the polyvinyl acetate binder.

(b) To 15 parts of a 55% solids aqueous emulsion of polyvinyl acetate (intrinsic viscosity=1.3) were added 7.5 parts of toluene, and this mixture was then stirred until a smooth paste was obtained. To this paste were added 65 parts of ethyl alcohol and 0.8 part of diethyl phthalate. 58 parts of a corn dextrin were thereafter suspended in the resulting solution of the polyvinyl acetate, and the resulting dispersion was then coated onto a paper substrate. Upon evaporation of the solvent mixture from the coating, there was obtained a dried, consolidated layer of discrete remoistenable adhesive particles which were bound to each other and to the substrate by means of the polyvinyl acetate binder.

(c) To 15 parts of a 60% solids aqueous emulsion of polyvinyl acetate (intrinsic viscosity=0.6) were added 7.5 parts by weight of toluene, and this mixture was then stirred until a smooth paste was obtained. To this paste were added 65 parts of ethyl alcohol and 0.8 part of diethyl phthalate. 40 parts of a corn dextrin were thereafter suspended in the resulting solution of the polyvinyl acetate, and this dispersion was then coated onto a paper substrate. Upon evaporation of the solvent mixture from the coating, there was obtained a dried, consolidated layer of discrete remoistenable adhesive particles which were bound to each other and to the substrate by means of the polyvinyl acetate binder.

(d) To 15 parts of a 50% solids emulsion of polyvinyl butyral (molecular weight of approximately 225,000) containing 20 parts of dibutyl sebacate per 100 parts of resin were added 7.5 parts of ethyl acetate and this mixture was then stirred until a smooth paste was obtained. To this paste were added 65 parts of ethyl alcohol. 58 parts of a corn dextrin were thereafter suspended in the resulting solution of polyvinyl butyral, and the dispersion was then coated onto a paper substrate. Upon evaporation of the solvent mixture from the coating, there was obtained a dried, consolidated layer of discrete remoistenable adhesive particles which were bound to each other and to the substrate by means of the polyvinyl butyral binder.

(e) To 15 parts of a 46% solids latex of a 87:13 copolymer of ethyl acrylate:methyl methacrylate (intrinsic viscosity=1.57/5) were added 7.5 parts of ethyl acetate and this mixture was then stirred until a smooth paste was obtained. To this paste were added 65 parts of ethyl alcohol, whereupon 58 parts of a pregelatinized waxy maize fluidity starch were suspended in the resulting solution of acrylate copolymer, and the resulting dispersion was then coated onto a paper substrate. Upon evaporation of the solvent mixture from the coating, there was obtained a dried, consolidated layer of discrete remoistenable adhesive particles which were bound to each other and to the substrate by means of the polyacrylate binder.

(f) To 15 parts of a 28% solids latex of a 30:40:40 methyl methacrylate:ethyl acrylate:methacrylic acid terpolymer (intrinsic viscosity=0.86/14) plus 0.4% of a bifunctional glycol cross-linking agent were added 65 parts of ethyl alcohol and this mixture was stirred until a smooth lacquer was obtained. 50 parts of a corn dextrin were thereafter suspended in the solution, and the resulting dispersion was coated onto a paper substrate. Upon evaporation of the solvent mixture from the coating, there was obtained a dried, consolidated layer of discrete remoistenable adhesive particles which were bound to each other and to the substrate by means of the terpolymer binder.

*Example II*

This example illustrates the production of a remoistenable adhesive product which exhibits a high degree of dimensional stability by means of the process of our invention, wherein a water immiscible solvent is employed to dissolve the binder particles.

To 15 parts of a 55% solids aqueous emulsion of polyvinyl acetate (intrinsic viscosity=1.3) were added 7.5 parts of ethyl acetate, and this mixture was stirred until a smooth paste was obtained. To this paste were added 65 parts of ethyl acetate. 58 parts of a corn dextrin were thereafter suspended in the resulting solution of the polyvinyl acetate. The resulting dispersion was milled for smoothness and then coated onto a paper substrate. Upon evaporation of the solvent mixture from the coating, there was obtained a dried, consolidated layer of discrete remoistenable adhesive particles which were bound to each other and to the substrate by means of the polyvinyl acetate binder.

Any departure from the above description which conforms to the present invention is intended to be included within the scope of the invention as defined by the following claims.

We claim:

1. A remoistenable adhesive composition comprising a suspension of discrete particles of a remoistenable adhesive material in a solution of a water-insoluble polymer dissolved in a solvent mixture, said solvent mixture comprising a primary solvent and a secondary solvent, said primary solvent effecting the swelling of the particles of said polymer and said secondary solvent effecting the solution of the swollen polymer particles, said remoistenable adhesive material bearing soluble in water and insoluble in said solution of the water-insoluble polymer, said remoistenable adhesive material being selected from the group consisting of carbohydrates, animal glue and water-activatible casein; and said water-insoluble polymer being in the form of an aqueous emulsion and being selected from the group consisting of polyvinyl acetate; polyvinyl butyral; copolymers of ethyl acrylate and methyl methacrylate; and, terpolymers of methyl methacrylate, ethyl acrylate and methacrylic acid; wherein said polymers have an intrinsic viscosity ranging from 0.6 to 1.8, said polymers being selected from the group consisting of polyvinyl acetate; polyvinyl butyral; copolymers of ethyl acrylate and methyl methacrylate; and terpolymers of methyl methacrylate, ethyl acrylate and methacrylic acid.

2. The remoistenable adhesive composition of claim 1 wherein said secondary solvent is a water miscible solvent.

3. The remoistenable adhesive composition of claim 1 wherein said secondary solvent is a water immiscible solvent.

4. A remoistenable adhesive composition comprising a suspension of discrete particles of a remoistenable adhesive material in a solution of a water-insoluble polymer dissolved in a solvent, said solvent effecting the swelling and solution of the particles of said polymer, said remoistenable adhesive material being soluble in water and insoluble in said solution of the water-insoluble polymer, said remoistenable adhesive material being selected from the group consisting of carbohydrates, animal glue and water-activatible casein; and said water-insoluble polymer being in the form of an aqueous emulsion and being selected from the group consisting of polyvinyl acetate; polyvinyl butyral; copolymers of ethyl acrylate and methyl methacrylate; and, terpolymers of methyl methacrylate, ethyl acrylate and methacrylic acid; wherein said polymers have an intrinsic viscosity ranging from 0.6 to 1.8, said polymers being selected from the group consisting of polyvinyl acetate; polyvinyl butyral; copolymers of ethyl acrylate and methyl methacrylate; and terpolymers of methyl methacrylate, ethyl acrylate and methacrylic acid.

5. The remoistenable adhesive composition of claim 4 wherein said solvent is a water miscible solvent.

6. The remoistenable adhesive composition of claim 4 wherein said solvent is a water immiscible solvent.

7. A method for making remoistenable adhesive which comprises adding a solvent to an aqueous emulsion of a water-insoluble polymer, said solvent effecting the swelling and solution of the particles of said polymer, and suspending discrete particles of a remoistenable adhesive material in the solution of said water-insoluble polymer, said remoistenable adhesive material being soluble in water and insoluble in said solution of the water-insoluble polymer, said remoistenable adhesive material being selected from the group consisting of carbohydrates, animal glue and water-activatible casein; and, said water-insoluble polymer being selected from the group consisting of polyvinyl acetate; polyvinyl butyral; copolymers of ethyl acrylate and methyl methacrylate; and, terpolymers of methyl methacrylate, ethyl acrylate and methacrylic acid; wherein said polymers have an intrinsic viscosity ranging from 0.6 to 1.8, said polymers being selected from the group consisting of polyvinyl acetate; polyvinyl butyral; copolymers of ethyl acrylate and methyl methacrylate; and terpolymers of methyl methacrylate, ethyl acrylate and methacrylic acid.

8. A method for making a remoistenable adhesive which comprises adding a primary solvent to an aqueous emulsion of a water-insoluble polymer, said primary solvent effecting the swelling of the particles of said polymer, thereafter adding a secondary solvent to said solution of swollen polymer particles, said secondary solvent acting to dissolve the swollen polymer particles, and thereupon suspending discrete particles of a remoistenable adhesive material in the resulting solution of said water-insoluble polymer, said remoistenable adhesive material being soluble in water and insoluble in said solution of the water-insoluble polymer, said remoistenable adhesive material being selected from the group consisting of carbohydrates, animal glue and water-activatible casein; and, said water-insoluble polymer being selected from the group consisting of polyvinyl acetate; polyvinyl butyral; copolymers of ethyl acrylate and methyl methacrylate; and, terpolymers of methyl methacrylate, ethyl acrylate and methacrylic acid; wherein said polymers have an intrinsic viscosity ranging from 0.6 to 1.8, said polymers being selected from the group consisting of polyvinyl acetate; polyvinyl butyral; copolymers of ethyl acrylate and methyl methacrylate; and terpolymers of methyl methacrylate, ethyl acrylate and methacrylic acid.

9. The method of claim 8 wherein said secondary solvent is a water miscible solvent.

10. The method of claim 8 wherein said secondary solvent is a water immiscible solvent.

References Cited by the Examiner

UNITED STATES PATENTS

| | | | |
|---|---|---|---|
| 2,360,477 | 10/44 | Dahle | 260—91.3 |
| 2,640,816 | 6/53 | Germain | 260—29.6 |
| 2,917,396 | 12/59 | Agulnick | 260—17.4 |
| 3,104,179 | 9/63 | Prior | 260—8 |

OTHER REFERENCES

"Elvanol" (published by Du Pont Co., 1947, page 7).

WILLIAM H. SHORT, *Primary Examiner.*

LEON J. BERCOVITZ, *Examiner.*